US011355976B2

(12) United States Patent
Mongeau

(10) Patent No.: US 11,355,976 B2
(45) Date of Patent: Jun. 7, 2022

(54) INTEGRAL FLUID COOLING OF ELECTRICAL MACHINE

(71) Applicant: Vestas Wind Systems A/S, Aarhus (DK)

(72) Inventor: Peter Mongeau, Center Conway, NH (US)

(73) Assignee: Vestas Wind Systems A/S, Aarhus N. (DK)

( * ) Notice: Subject to any disclaimer, the term of this patent is extended or adjusted under 35 U.S.C. 154(b) by 405 days.

(21) Appl. No.: 15/540,277

(22) PCT Filed: Dec. 9, 2015

(86) PCT No.: PCT/DK2015/050387
§ 371 (c)(1),
(2) Date: Jun. 28, 2017

(87) PCT Pub. No.: WO2016/107626
PCT Pub. Date: Jul. 7, 2016

(65) Prior Publication Data
US 2018/0013326 A1    Jan. 11, 2018

Related U.S. Application Data

(60) Provisional application No. 62/097,659, filed on Dec. 30, 2014.

(30) Foreign Application Priority Data

Mar. 17, 2015   (DK) ............................ PA 2015 70152

(51) Int. Cl.
*H02K 1/20*    (2006.01)
*H02K 1/16*    (2006.01)
*H02K 9/19*    (2006.01)

(52) U.S. Cl.
CPC ............... *H02K 1/20* (2013.01); *H02K 1/16* (2013.01); *H02K 9/19* (2013.01)

(58) Field of Classification Search
CPC ............... H02K 1/16; H02K 1/20; H02K 9/19
See application file for complete search history.

(56) References Cited

U.S. PATENT DOCUMENTS 3,447,002 A    5/1969   Ronnevig
4,691,131 A *  9/1987   Nakano .................... H02K 9/19
                                                   310/216.004
(Continued)

FOREIGN PATENT DOCUMENTS

DE    2917717 A1    11/1980
EP    2463991 A2     6/2012
(Continued)

OTHER PUBLICATIONS

Machine translation of EP2463991 (Year: 2012).*
(Continued)

*Primary Examiner* — Bernard Rojas
(74) *Attorney, Agent, or Firm* — Wood Herron & Evans LLP

(57) ABSTRACT

The present invention relates to a laminated stator stack for an electric machine comprising, a plurality of stator teeth and stator slots, for receiving at least one electrical conductor, at least one axial coolant duct, at least one outwards radial coolant duct and at least one inwards radial coolant duct, wherein the ducts are arranged internally in the laminated stator stack and interconnected to form a predominantly closed flow path, the outwards and inwards radial coolant ducts extent into the stator teeth, for cooling of the stator teeth, and the laminated stator stack comprises a plurality of lamination sheets.

22 Claims, 7 Drawing Sheets

(56) References Cited

U.S. PATENT DOCUMENTS

| | | | |
|---|---|---|---|
| 2002/0125788 A1* | 9/2002 | Lemon | H01F 27/323 |
| | | | 310/400 |
| 2007/0138878 A1* | 6/2007 | Down | H02K 3/24 |
| | | | 310/54 |
| 2012/0080982 A1* | 4/2012 | Bradfield | H02K 1/20 |
| | | | 310/60 A |
| 2016/0118862 A1* | 4/2016 | Maki-Ontto | H02K 1/20 |
| | | | 310/59 |
| 2016/0190878 A1* | 6/2016 | Saari | H02K 1/185 |
| | | | 310/59 |
| 2016/0301286 A1* | 10/2016 | Salter | H02K 3/48 |
| 2017/0353089 A1* | 12/2017 | Nies | H02K 1/20 |

FOREIGN PATENT DOCUMENTS

| | | |
|---|---|---|
| GB | 358240 A | 10/1931 |
| SE | 383810 B | 3/1976 |
| WO | 2013170883 A1 | 11/2013 |

OTHER PUBLICATIONS

Danish Patent and Trademark Office, Search Report in PA 2015 70152, dated May 20, 2015.
European Patent Office, International Search Report and Written Opinion in PCT/DK2015/050387, dated Jul. 15, 2016.

* cited by examiner

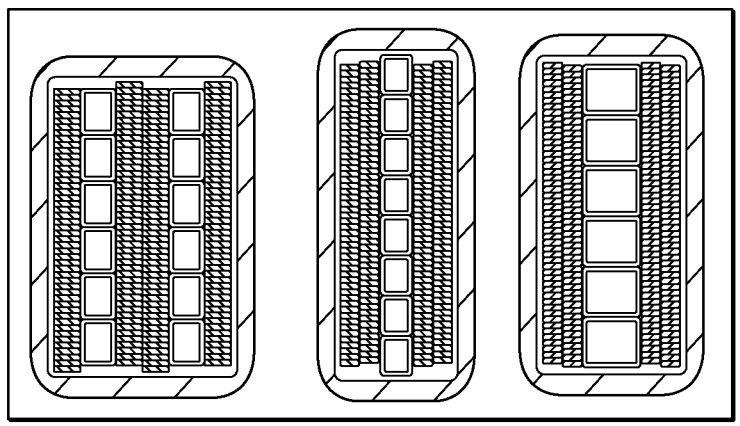 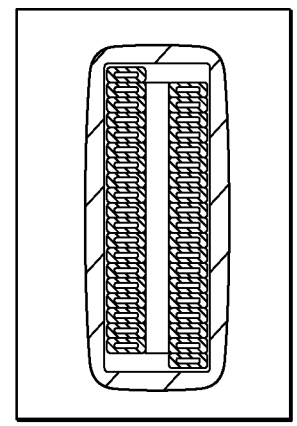
FIG. 5a  FIG. 5b
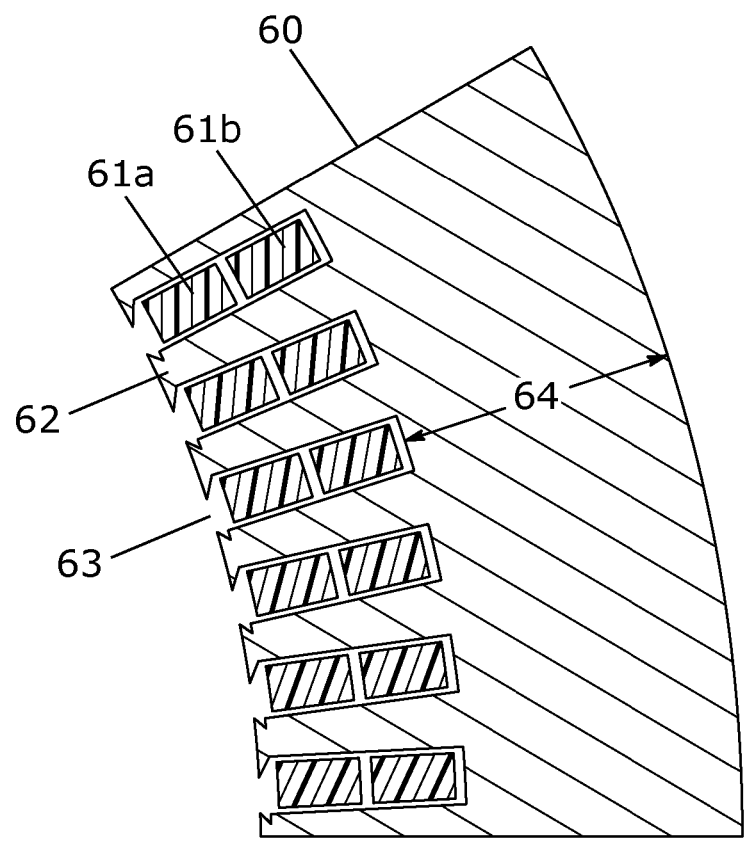
FIG. 6
PRIOR ART

INTEGRAL FLUID COOLING OF ELECTRICAL MACHINE

FIELD OF THE INVENTION

The present invention relates to cooling of a stator sub-assembly for an electrical machine.

BACKGROUND OF THE INVENTION

Electrical machines like transformers, motors and generators have a high efficiency; however, the electrical losses reach levels that need to be dealt with through appropriate methods. The life expectancy of the electrical winding isolation strongly depends on temperature, an increase of the temperature level by 5 to 8 Kelvin results in a halving of the life expectancy. As the winding resistance is temperature dependent, an improvement of the cooling would lead to a decrease in the copper losses.

Therefore, all electrical machines require cooling of the stator sub-assembly due to losses in the electrical steel, in the windings as well as any losses absorbed from other parts of the electrical machine (rotor, windage, radiation, etc.).

There are two main categories when it comes to cooling of electrical machines: air-cooled or liquid-cooled. A combination of both is often seen as well.

Common approaches to cooling involve active fluid cooling in the slots of the stator or axial vents in the stator stack which permit air to circulate within the stator.

The proposed approach is an alternative means of introducing fluid cooling to the stator without involving the complexity of cooling in the slot or the use of an axially spaced vented core stack with some kind of gas flow in the machine cavity.

It is an objective of the present invention to make an electrical machine with better cooling properties than known from the prior art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present invention relates to a laminated stator stack for an electric machine comprising:
  a plurality of stator teeth and stator slots, for receiving at least one electrical conductor,
  at least one axial coolant duct,
  at least one outwards radial coolant duct and
  at least one inwards radial coolant duct,
wherein the ducts are arranged internally in the laminated stator stack and interconnected to form a predominantly closed flow path, the outwards and inwards radial coolant ducts extent into the stator teeth, for cooling of the stator teeth, and the laminated stator stack comprises a plurality of lamination sheets.

Lamination sheets for a stator stack are generally ferromagnetic and are designed to perform the function of capturing/enhancing the electromagnetic field as is typical for an electromagnetic stator.

The sections having radial ducts in them, have reduced electromagnetic functionality and this has to be accounted for in the overall active stator length.

According to one embodiment of the invention the outward radial cooling ducts are formed in a first group of lamination sheets and the inward radial cooling ducts are formed in a second group of lamination sheets, and wherein the outward radial cooling ducts and the inwards radial cooling ducts are interconnected in the teeth, via at least one axial tooth tip duct arranged in a tooth tip.

According to one embodiment of the invention the outward radial cooling ducts and the inward radial cooling ducts are formed in a same section of lamination sheets with radial cooling ducts.

According to one embodiment of the invention the stack comprises a plurality of alternation between a section of standard lamination sheet, forming the axial cooling ducts and a section of radial cooling ducts, starting and ending with a section of standard lamination sheet.

According to one embodiment of the invention an axial length of the sections of standard lamination sheet are smaller at the center of the laminated stator stack and larger at the ends of the laminated stator stack.

An advantage, of the present embodiment, is that hot spots in the stack can be avoided, as the axial extent of sections of standard lamination sheet without cooling are not as wide in the center of the stack as in the ends of the stack. Thus, a higher percentage of the stator stack in the center is made of sheets with radial ducts than at the ends of the stack. Conversely, for machines where the end turn losses are higher, regions of the stator stack can be constructed with a higher percentage of radial ducts than at the middle of the stator stack.

According to one embodiment of the invention an axial length of the sections of radial cooling ducts are larger at the center of the laminated stator stack and smaller at the ends of the laminated stator stack.

The advantage of the present embodiment is the same as for the previous embodiments, the difference here, is that the width of the sections with the radial cooling ducts are altered, but still a higher percentage of the stator stack is made of sheets with radial ducts than at the ends of the stack such that the cooling distribution within the overall stack can be adjusted as appropriate.

According to one embodiment of the invention, less than 10 percent of a total stack length comprises lamination sheets with radial cooling ducts.

According to one embodiment of the invention, 10 to 20 percent of a total stack length comprises lamination sheets with radial cooling ducts.

According to one embodiment of the invention the section of standard lamination sheet are made of a first material and section of radial cooling ducts are made of a second material, wherein the second material has a higher thermal conductivity than the first material.

A second aspect of the present invention relates to a lamination sheet for a laminated stator stack, wherein the lamination sheet comprises an outer outline, an inner outline, at least a first and a second hole in a yoke region of the lamination sheet, and in addition at least one cut out area, starting from one of the at least two holes, arranged to facilitate a radial flow of a coolant, when used in a laminated stator stack.

A third aspect of the invention relates to an electric machine comprising a laminated stator stack according to the present invention, a shaft and at least one electrical winding arranged in a plurality of stator slots.

A fourth aspect of the invention relates to a method for cooling a laminated stator stack for an electric machine, comprising a plurality of stator teeth and a plurality of stator slots, and at least on one electrical conductor arranged in at least one of said stator slots, the method comprises, circulating a liquid coolant in at least one axial coolant duct arranged in a yoke region of the laminated stator stack, circulating the liquid coolant in at least one outwards radial coolant duct and, returning the liquid coolant through at least one inwards radial coolant duct to a second axial coolant duct arranged in a yoke region of the laminated stator stack, interconnecting the at least one outwards radial coolant duct with a corresponding at least one inwards radial coolant duct arranged internally in the laminated stator stack, forming a predominantly closed flow path, the radial coolant ducts extent into the stator teeth, thereby cooling the stator teeth.

The invention and it aspects describes a novel approach which favorably combines the benefits of a closed coolant flow that is captured within the core stack; yet it is able to combine the use of radial vents where the coolant is permitted to flow radially in the teeth section of the stack:

thereby decreasing the thermal distance to the higher loss sections of the stator (notably the core stack teeth which are typically at higher flux levels than the yoke and the windings, themselves).

As well as increasing the total heat exchange area available to the coolant many times beyond that which would be available to those captured coolant systems where the fluid is confided predominantly to the yoke section of the core stack.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

FIG. 5*a* shows examples of cooling ducts around the electrical conductor.

FIG. 5*b* shows an example of cooling ducts integrated in the electrical conductor.

FIG. 6 shows a section of an end view of a typical stator according to the prior art.

DETAILED DESCRIPTION

Figure 1:
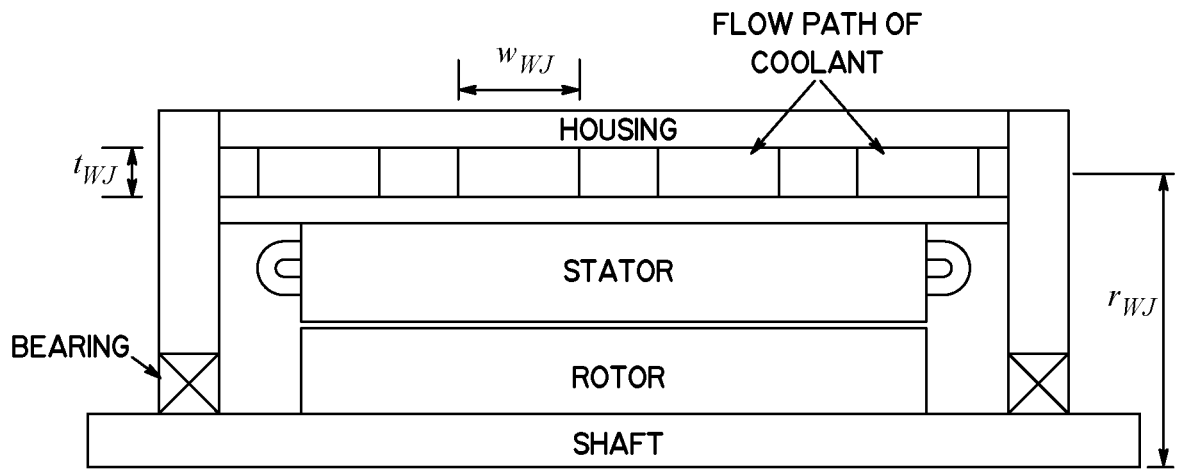
FIG. 1 shows a side view of a part of an electrical machine according to the prior art.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

The invention describes a novel approach, which combines the fluid handling benefits of a system with the captured coolant with the heat exchange benefits of the open flow non-captured coolant systems.

This is accomplished with the ordered stacking of lamination sheets, which have a combination of radial and axial ducts or channels impressed in the lamination sheets.

The repetitive pattern of lamination sheets provides the functionality of a radial duct where the fluid is allowed to flow radially into the tooth both inward and outward comprising a single cooled tooth section which can conduct heat away from the nearby regions of the core stack and windings in local proximity.

The wording inwards and outward refers to the flow direction of the coolant. The number, spacing and interior dimensions of the ducts can be adjusted as required to achieve the thermal design objectives of the machine.

Sections of the core stack, which have predominantly radial ducts in them, will not have the same magnetic properties as that of the core stack sections without such ducts. As such, some additional stack length of core stack material must be used to compensate. In this respect, the increased length of the stator stack is quite similar to that normally associated with any air-cooled machine, which uses axial spacers for radial airflow.

It should be understood that such invention can be applied equally well to inner stator radial field machines as well as to linear motion machines and axial field machines; actually to any electrical machine, which has a stator assembly, comprised of electromagnetic core stack with yoke and teeth regions and electrically conducting windings interspersed between the teeth. The radial field outer stator machine is used here just for illustration.

Furthermore, it should be understood that sections of the core stack which comprise the radial flow sections do not have to be made of electromagnetically active steel and can be made of any material that has good thermal conductivity and structural ability to support the flow channels (e.g. stainless steel, copper, brass, etc.).

The magnetic circuit of the electrical machine includes the stator and rotor laminated stack. These consist of laminated electrical sheets. Depending on the size and diameter of the laminated core stacks, there are a number of options for manufacturing the corresponding sheets.

The invention uses an approach involving the selective stacking of electric laminations each of which has a pattern of holes and or slots which when stacked up together join to form a fluid cooling duct system that is:

Integral to the stator stack.

Controls the flow of the coolant such that it can be contained within a typical liquid cooling system without relying on the open flow of coolant in the electric machine internal cavity There are typically two, or more, unique patterns of lamination sheets:
One simply with axial holes in the yoke/back iron section and/or holes in the tooth tips
The other with radial slots of slot kind which provide fluid connection between the yoke holes and the tooth tip holes
Suitable stacking of a sequence of the different stator sheets can provide a closed circuit coolant flow, between the predominantly axial flow used for transport of the fluid within the stack, and that of the radial coolant flow, which is used predominantly for heat transfer.

A high degree of heat transfer area can thus be developed, without the complication of axial duct spacers, fans and ventilators.

The electromagnetic functionality of the machine being designed, assuming judicious use of the ratio of integral radial ducted laminations to those that are simply manifold collectors of the coolant and used for transport purpose within the core stack.

Use of non-electrical conducting fluids and those that are, in particular, compatible with conventional insulation system material (electrical impregnating resin, mica tape, polyimide films, etc. will not influence normal machine functionality.

Liquid-cooled machines typically use a shrink fit water jacket hosing which cools the stator sub-assembly via conduction through the stator yoke. Such approach can be effective, but is dependent on a carefully controlled degree of interference fit between the stator and housing sub-assemblies.

Furthermore, the heat transport cross-section is limited to that only of a simple cylinder surface between them two.

In addition, there is a long thermal distance between that of the cooled housing and that of the teeth/slot section where the losses in the core and windings are the highest.

Captured flow systems, which employ axial ducts in the yoke section, are by comparison limited to the total amount of heat exchange area that can be made practically available to the fluid. The cooling effect of the fluid is limited to the regions of the stator yoke in local proximity. The cooling of the rest of the stator (core teeth and windings) are then limited to what can be transported via thermal conduction along the radial extent of the teeth and limited by the cross-section area of said teeth.

Alternatively, non-captured flow systems, which utilize axially separate radial vents, are practically limited to the use of a gaseous cooling medium which has much less cooling capacity than a cooling fluid (such as oil). Furthermore, the uncontrolled venting of the gas into the rotating cavity of the stator and the rotor gives rise to additional machine losses associated with increased windage.

FIG. 1 shows an example of a liquid cooled electrical machine, the figure shows only half of the machine, as the lower part is symmetrical around the shaft.

Figure 2:
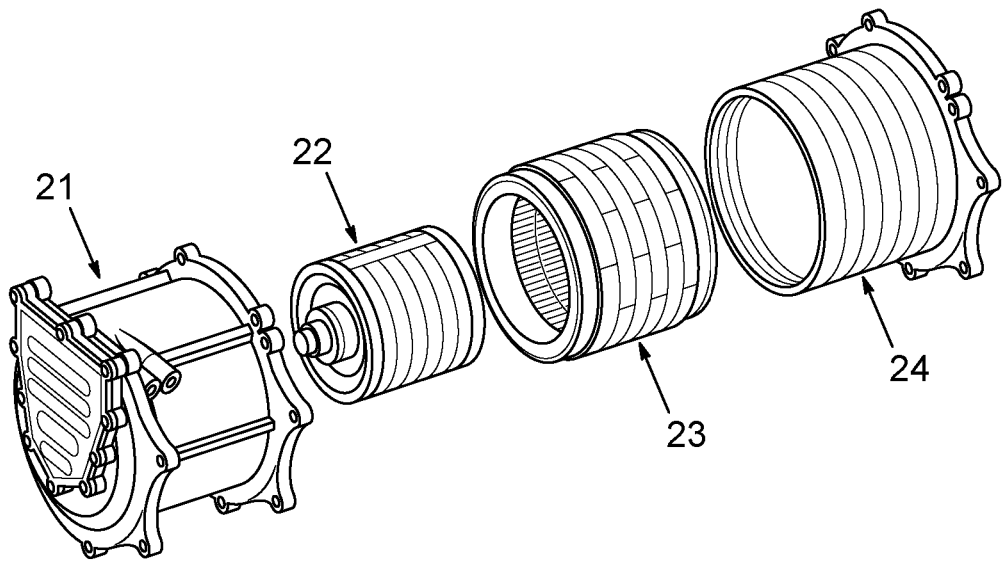
FIG. 2 shows the main elements in an electrical machine.

FIG. 2 shows the main elements of a shrink fit electrical machine. Starting from left to right with the external housing 21 with motor and end shield, then the rotor 22 here shown with internal permanent magnet. The rotor 22 is inserted in the stator lamination stack 23, here also showing the copper winding extending outside the lamination stack 23, finally the internal housing with helical cooling contour 24. The rotor 22 fits inside the stator stack 23, which fits inside the internal housing 24, which again fits inside the external housing 21.

This approach gets further constrained when the stator is so large, that it is no longer made from layers of complete rings of electrical steels—but instead from segments or sections stacked circumferentially to make a complete cylindrical body for electromagnetic purposes. The yoke or back iron of the stator is no longer a simple uninterrupted ring thereby compromising the interference fit that can be reliably maintained between the stator core stack and the surrounding water jacket.

Air-cooling is quite common in electric machines, larger machines (>0.5 meter stator Outer Diameter) or higher power ratings (Power greater than 100 kW) are typified by the use of an internal gas flow design which is directed through axial spaces in the stator core stack (known as vents). Such vents permit the cooling gas (typically air) to have a large surface heat transfer area with that of the stator sub-assembly and brings the coolant through the radial thickness of the stator including that of the teeth and windings.

However, such systems are constrained by the coolant to flow throughout the internal cavity of the machine leading to additional drag (windage). Larger effective volume of control and a more complicated stator structure, which requires additional means to strengthen and stiffen the overall structure.

Figure 3:
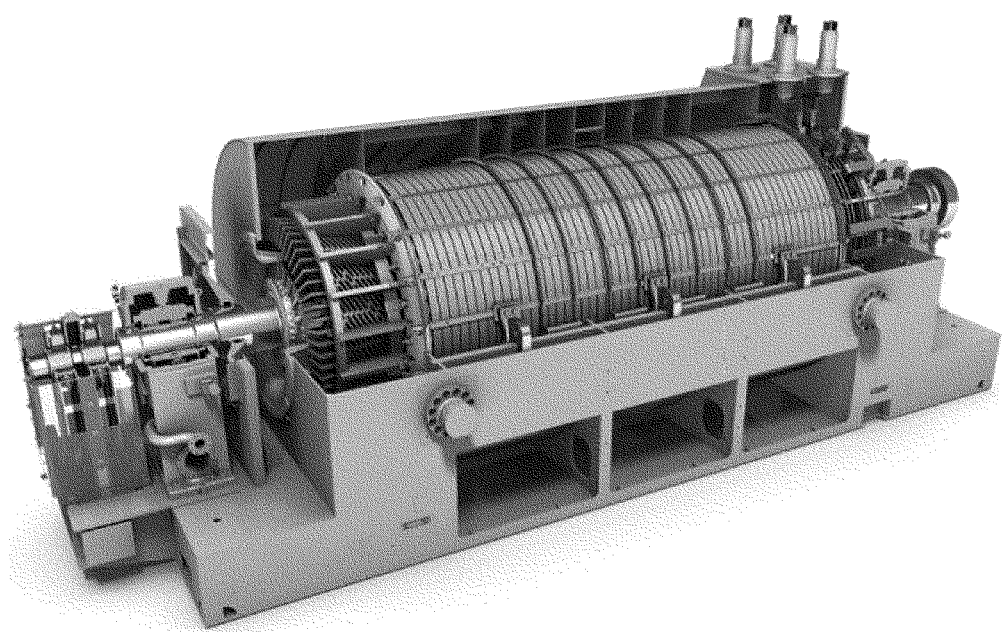
FIG. 3 shows a cut open view of an electrical machine according the prior art.
Figure 4:
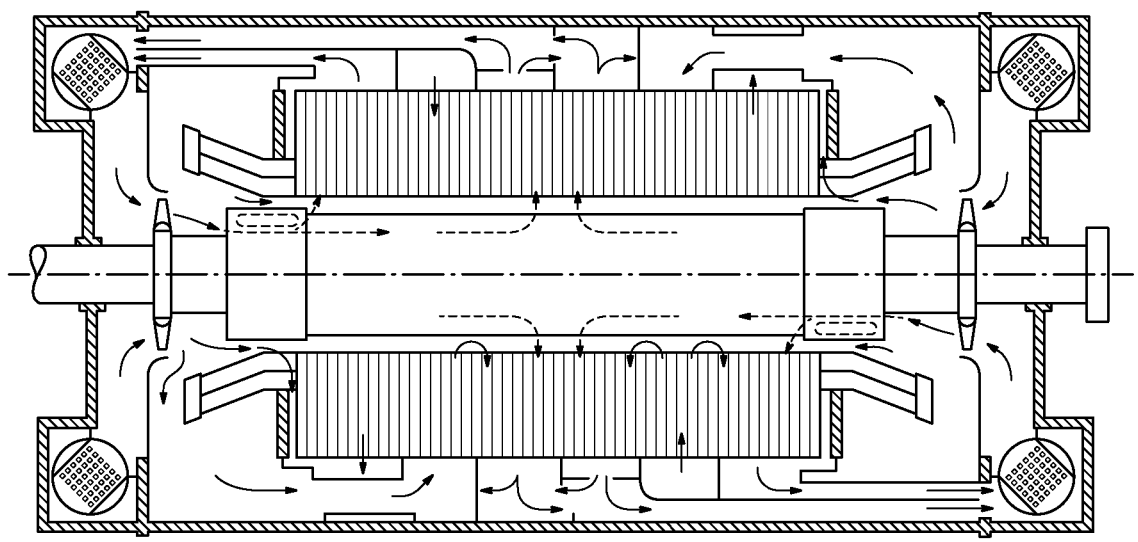
FIG. 4 shows the air flow of an air cooled machine according to the prior art.

FIG. 3 shows a cut open example of an air cooled electrical machine, according to the prior art, whereas FIG. 4 shows the actual airflow within the air-cooled electrical machine, seen from a side view.

In FIG. 4 air is circulated inside the machine. Heat is transported from the machine either by a closed loop heat exchanger or simply by blowing fresh air in to the machine. In certain environments it is not advisable to blow fresh air directly inside the machine even if the air is filtered.

Liquid-cooled machines typically use a shrink fit water jacket hosing which cools the stator sub-assembly via conduction through the stator yoke, such as shown in FIG. 1 and FIG. 2.

Very high performance machines (such as turbo-generators) rely on an even higher performance cooling system where the coolant is introduced to flow within the slot directly or that of the conductors that reside in the slot.

This approach leads to high heat transfer area and arguably the shortest thermal resistance conduction path between coolant and that region of the highest losses (the windings and the core teeth).

FIG. 5a shows examples of windings from a high performance machine wherein a number of ducts for fluid coolant are embedded in the slots, or more specific it is embedded in a winding pack, where the copper/aluminum windings are arranged around the ducts.

FIG. 5b shows another example wherein the actual copper/aluminum conductor is made in a hollow structure, with a duct for a fluid coolant, so the fluid coolant flows inside the actual conductor.

However, systems according to FIG. 5, necessarily involve complicated cooling connection schemes and must devote some of the total slot area to cooling passageways rather than that of conductor and insulation.

Thereby increasing the current density and specific losses, as the space for conductors is reduced.

The present invention tries to solve this problem, by moving the duct for fluid coolant from the slot to the teeth of the machine, whereby the conductor and the electrical insulation can fully utilize the area defined by the slots.

FIG. 6 displays a section of a stator for an electrical machine for a typical radial field outer stator.

The stator core 60 is made of circular stator lamination sheets (not shown in full picture, FIG. 6 only shows a small section) which by stacking a plurality of sheets forms a stator core stack, it is clear to the skilled person, what a stator lamination sheet according to the prior art looks like. The Stator core 60 comprises a yoke or back iron region 64 and a plurality of stator teeth 62. The stator teeth 62 are formed by a cut out, called the stator slots 63. The slots 63 allows the stator to receive one or more stator windings 61a, 61b. The yoke 64 is both for magnetic purpose and for mechanical structure and cooling purposes.

In some embodiments, the stator winding comprises only one layer 61a.

In other embodiments, the stator winding comprises at least to layers 61a and 61b.

As the main source for heating losses in the stator assembly comes from losses in the stator winding and radiation heat from the rotor, it is important to cool the teeth 62 of the stator assembly.

Figure 7:
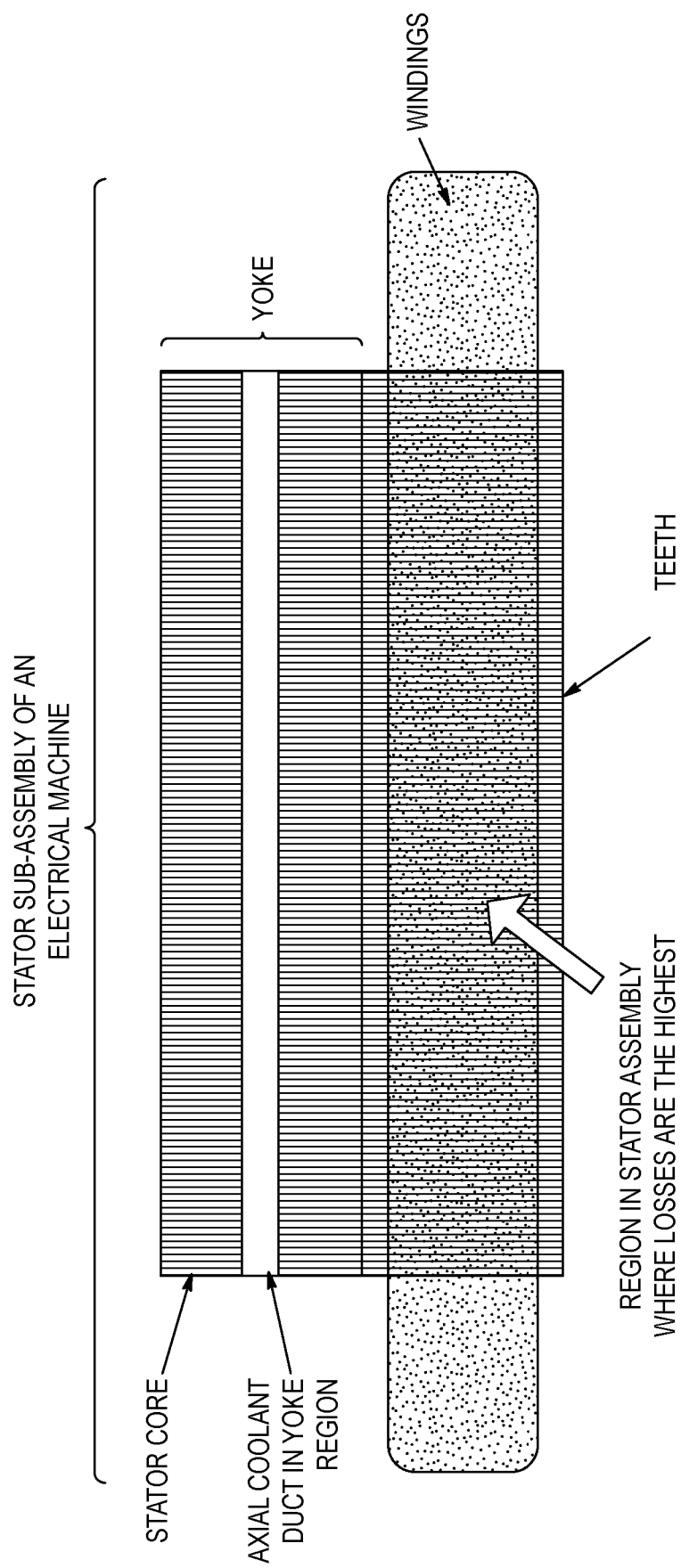
FIG. 7 shows a side view of a typical stator with axial duct in the yoke region of the stator sub-assembly

FIG. 7 shows a typical stator with axial duct in the yoke region, the heat exchange surface is limited to yoke region, which is thermally distant from region of high losses in the stator subassembly, i.e. windings and teeth.

In a preferred embodiment of the invention, the electrical steel lamination sheet pattern is arranged such that radial cooling ducts in teeth section connects the sets of coolant holes in yoke region.

Figure 8A:
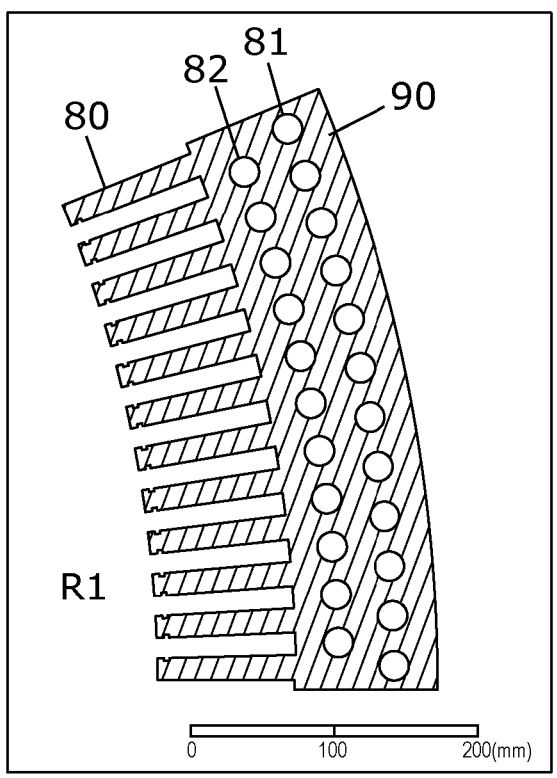
FIGS. 8*a*, 8*b*, 9*a* and 9*b* shows an example of a steel lamination sheet patterns used in integral core stack cooling approach.

FIG. 8a shows a section of a stator steel lamination sheet 100 with axial coolant holes 81, 82 in the yoke 90, the lamination sheet of FIG. 8a is labeled R1, and is also known as a standard lamination sheet.

Figure 8B:
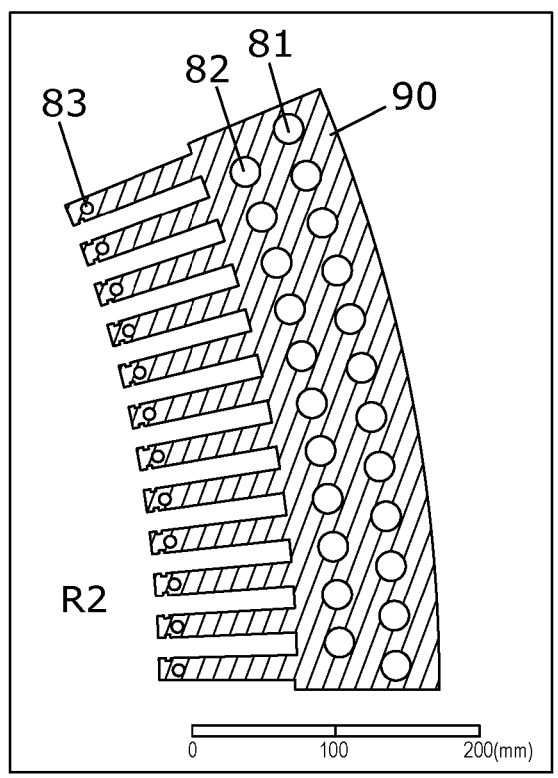

FIG. 8b shows a lamination sheet where the yoke 90 is with axial coolant holes in 81, 82 and furthermore holes 83 in tips of the teeth 80, the lamination sheet of FIG. 8b is labeled R2.

Figure 9A:
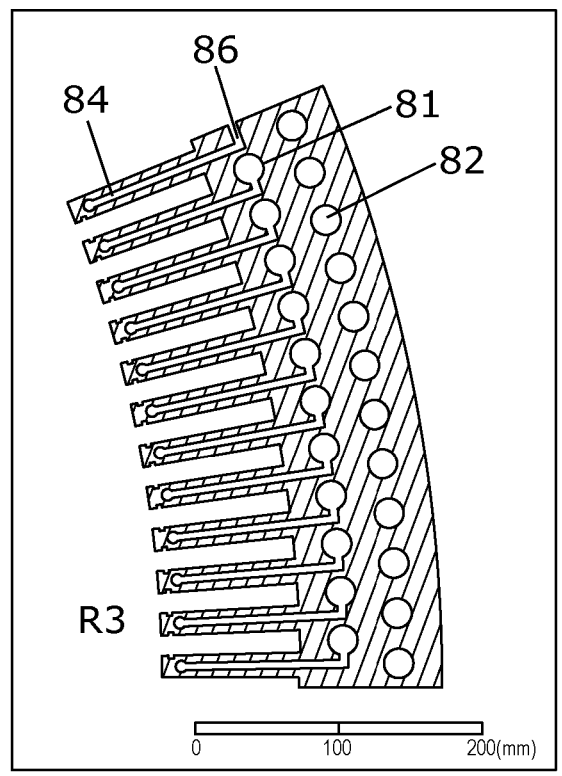

FIG. 9a shows a lamination sheet with axial coolant holes 81, 82, plus a first radial cooling ducts 84 in tooth sections connecting to one set of yoke holes 82 with the tooth tip holes 83, thereby forming passway for coolant to flow. The ducts 84 shows an elbow angle 86, which is optional. The lamination sheet of FIG. 9a is labeled R3.

In an embodiment, the axial coolant holes 81 are arranged, so the first radial cooling ducts 84 goes in a straight radial line from the tooth tip holes 83 to the axial coolant holes 81, without the elbow angle 86.

Figure 9B:
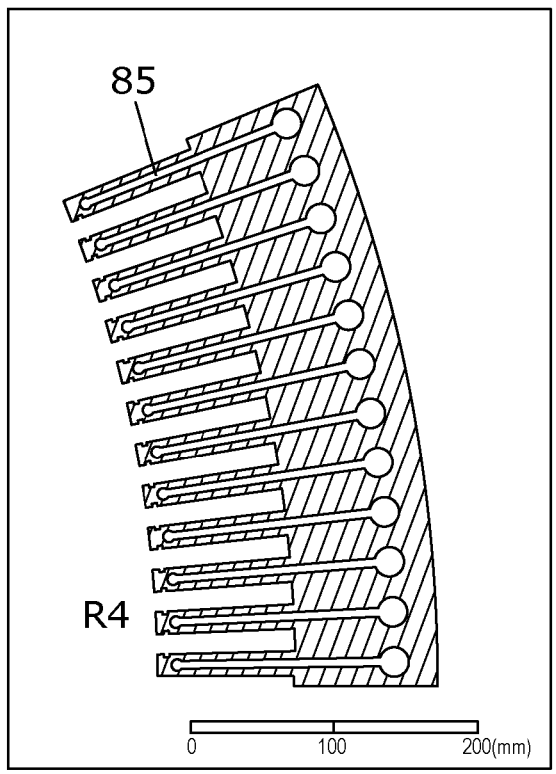

FIG. 9b shows a lamination sheet with axial coolant holes 81, 82 plus a second set of radial cooling ducts 85 in the tooth sections 80 connecting to the second set of yoke holes 81. The lamination sheet of FIG. 9b is labeled R4.

In an embodiment, the axial coolant holes 82 are arranged so the first radial cooling ducts 85 goes in a straight radial line from the tooth tip holes 83 and the form an elbow angle to the axial coolant holes 82.

Different embodiments can be combined, depending on the arrangement of the yoke hole 81, 82, and the magnetic flux design of the stator steel lamination sheet.

With the present embodiment, and also the following embodiment, the yoke/back iron section radial thickness is increased overall so that the uninterrupted thickness of the magnetic section (including the effect of the axial ducts) is not reduced, and the overall core losses in the yoke and/or onset of saturation is not compromised.

The embodiment of FIGS. 8 and 9 describes lamination sheets which when assembled will have inlet of the coolant in the ducts formed by the holes 82, i.e. the ducts closest to the center of the machine. Where the outlet will be through the outer ducts formed by the holes 81.

An advantage of the present embodiment is that the inlet is arranged closest to the center, where the highest temperature is expected, and thus needs the coolest coolant.

In an embodiment the axial ducts formed by axial holes 81 and the axial ducts formed by axial holes 82 are arranged such that the inlet for the coolant is in the axial holes 81 and the outlet through the axial holes 82.

It is further understood that the lamination sheets which have ducts in the teeth sections will be electromagnetically impaired compared to those that only have ducts in the yoke sections:

It is envisioned that such sections will compromised a small fraction of the overall stack length (10-20%) and in that respect represent the same sort of compromise needed in any electrical machine with axial vents.

Such sheets may not necessarily be made of an electromagnetic active material.

Hermetic sealing of the passageways is not considered essential to the approach, Provided coolant fluid or gas is compatible with insulation system (such as lubrication oil).

Use of bonded cores and/or VPI stack assemblies and in conjunction with axial preload of stack (which is normal for magnetic purposes) will minimize coolant bypass.

In an embodiment the electrical machine is designed so coolant, that does escape the stator stack, will be permitted to drain to a suitably placed sump within the machine housing and return to the fluid handling system.

Figure 10:
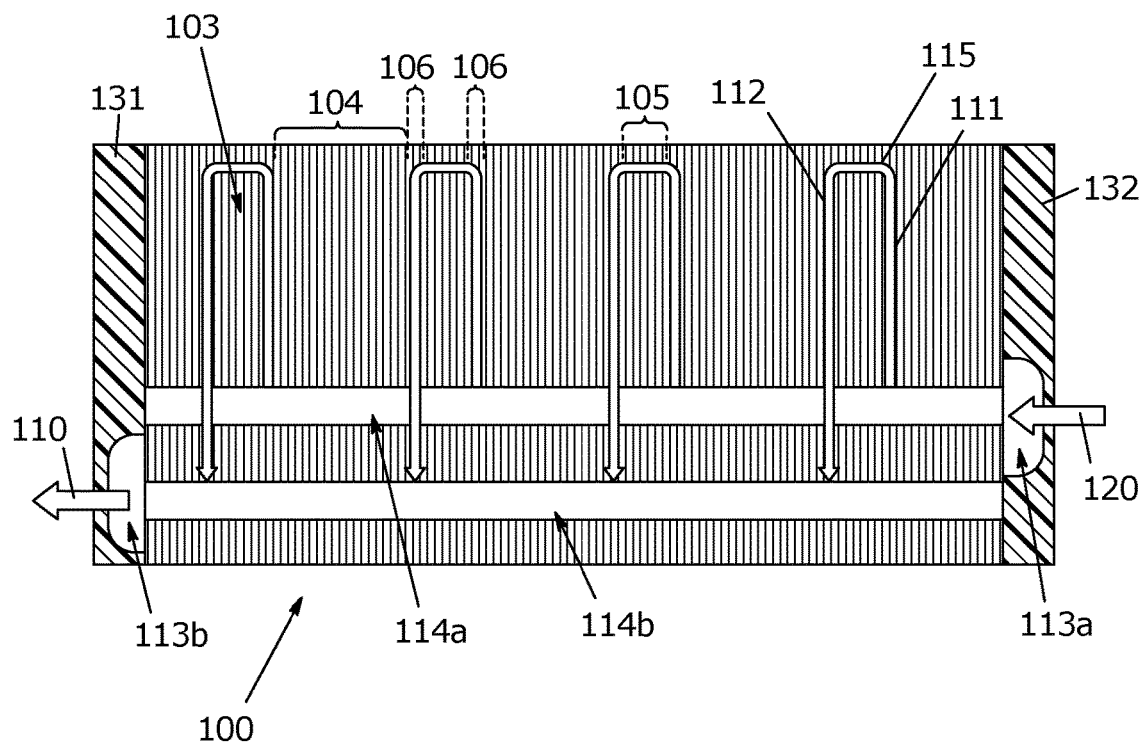
FIG. 10 shows a side view of the coolant flow, with coolant inlet in one end and coolant outlet in the other end.

FIG. 10 shows a side view of how the coolant flows through the stator lamination stack, i.e. stator subassembly 100. The upper part of FIG. 10 is the tooth tip end, and the lower part is the yoke region. The lamination stack is assembled with different lamination sheets, using the labels R1, R2, R3 and R4.

Starting from left to right the stator lamination comprises an end plate 131 with an outlet 110 for a liquid coolant. The end plate is often made of a thicker material than the lamination sheets. The first section of the lamination stack 104 are made with sheets with label R1, followed by a section 106 with radial cooling ducts 84 from axial hole 81 to the tooth tip hole 83, comprising sheets with label R4. The number of sheets with R4 label sets the size of the radial duct. The size should be arranged to suit the size of the tooth tip holes 83. The following section 106 is in fact the section where the lamination sheets have the tooth tip holes 83, i.e. sheets with label R2.

The last section of the stack comprises sheets with label R3, which has radial cooling ducts 85 from the axial hole 82 to the tooth tip hole 83; the sheets in this section are labeled R3.

The coolant enters the machine through an inlet 120, via a manifold 113a into the axial coolant duct 114a, where the coolant is pressed into a number of radial outwards ducts 111. The coolant then enters an axial tooth-tip coolant duct 115, and returns to the yoke region through a number of radial inwards ducts 112. In the yoke region, the coolant flows in the axial coolant duct 114b and exits the machine through an outlet 110, via a manifold 113b.

The stack is repeated a plurality of times. At the end of the stack, there is another end plate 132 with and opening for the coolant inlet.

The number of repetitions is a factor of distribution of the cooling of the stack. It is clear that the inlet temperature of the coolant is lower than the outlet temperature, thus a stack made according the FIG. 10, with only four coolant ducts to the tooth tip, will show a temperature gradient along the individual tooth along the full stator stack. The coolant mainly cools part of the tooth, i.e. the part where in the axial direction a cooling duct is present, and other parts of the tooth will therefore be cooled less. The present invention is still more efficient than cooling according the prior art.

A design with sufficient numbers of radial cooling ducts is therefore desirable. The number of ducts depends on many factors, such as thermal capacity of the coolant; flow speed in the radial cooling ducts; number of ducts in the stack length and of course the actual length of the stack. The design should minimize the temperature gradient along the stack length, which all factors may invoke.

In an embodiment an evenly distribution of the radial cooling ducts 84 and 85 along the stator lamination stack is achieved.

In an embodiment there are more radial cooling duct in the center of the stack and less in the ends of the stack 131, 132, as the temperature tends to be higher in the center of an electrical machine.

It is clear to the skilled person that there will be a pressure drop along the axial coolant ducts in the yoke, thus the radial ducts near the inlet 120 will experience a higher coolant pressure that the radial duct in the other ends.

When designing the stator stack, pressure drops can be compensated by having wider ducts where low pressure is expected, each radial duct will thereby have the same cooling effect.

Radial ducts may be as narrow as 2 mm and go up to 10 mm, depending on various aspects such as the pressure drop and the boundary layer of the liquid.

The advantage of the embodiment according to FIG. 10 is that the pressure drop along the axial inlet duct is compensated by having the coolant outlet in the opposite end of the stator lamination stack.

Figure 11:
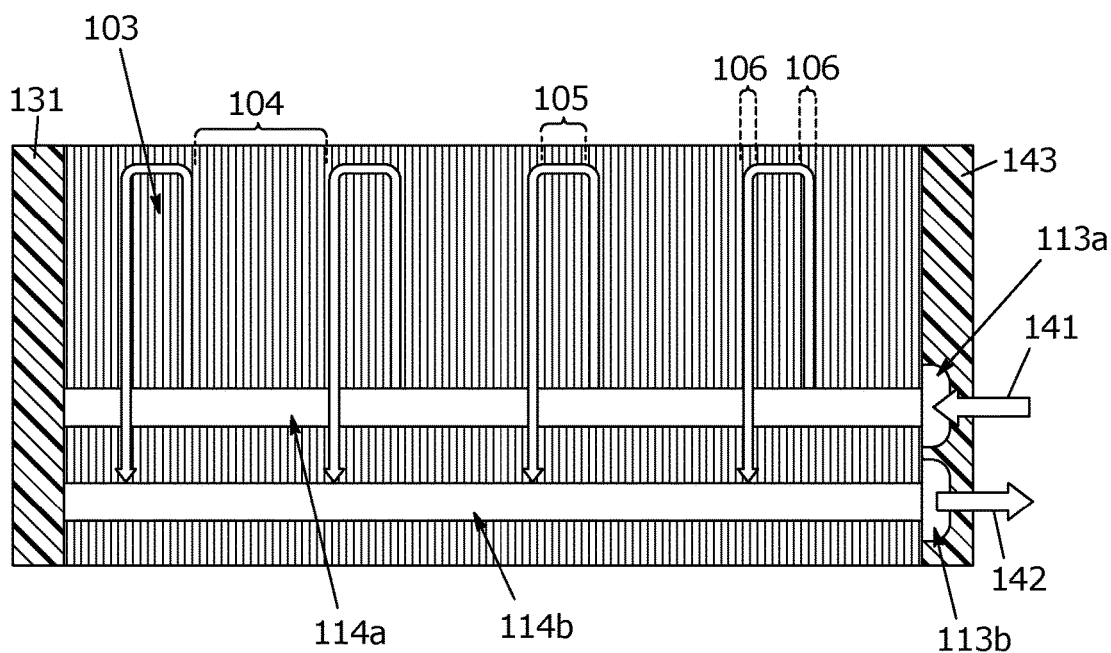
FIG. 11 shows a side view of the coolant flow, with coolant inlet in one end and coolant outlet in the same end.

FIG. 11 is similar to FIG. 10, with the main difference that the coolant inlet 141 and the coolant outlet 142 is arranged at the same end of the machine, i.e. in the same end plate 143.

The advantage of the embodiment according to FIG. 11 is that the inlet 120 and outlet 110 are arranged in the same end of the stator stack and thus easier to connect to an external cooler (not shown), For both FIG. 10 and FIG. 11 the end plate is arranged with a manifold 113a/113b for collecting/distributing the coolant from/to all the axial holes 81, 82.

As mentioned before, there will always be a change in the magnetic design when a substantial area of the tooth tip 80 is cut out in order to make space for the radial and axial ducts.

Alternative embodiment combines both radially inward and outward ducts in the same sheet.

This approach would have only two kinds of sheet patterns where one is functionally similar to a lamination sheet with axial air vents in the yoke part of the sheet used in conventional air-cooled machines.

Figure 12:
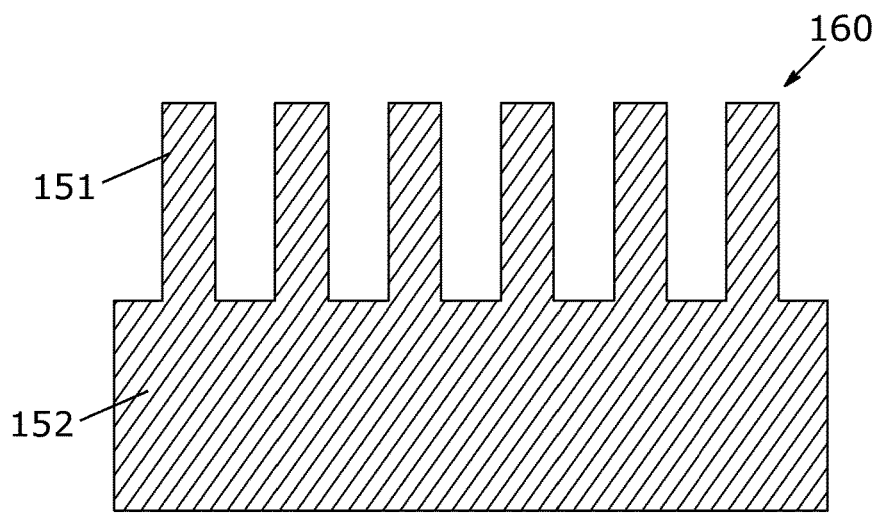
FIG. 12 shows an example of a steel lamination sheet, for use where no coolant flows.
Figure 13:
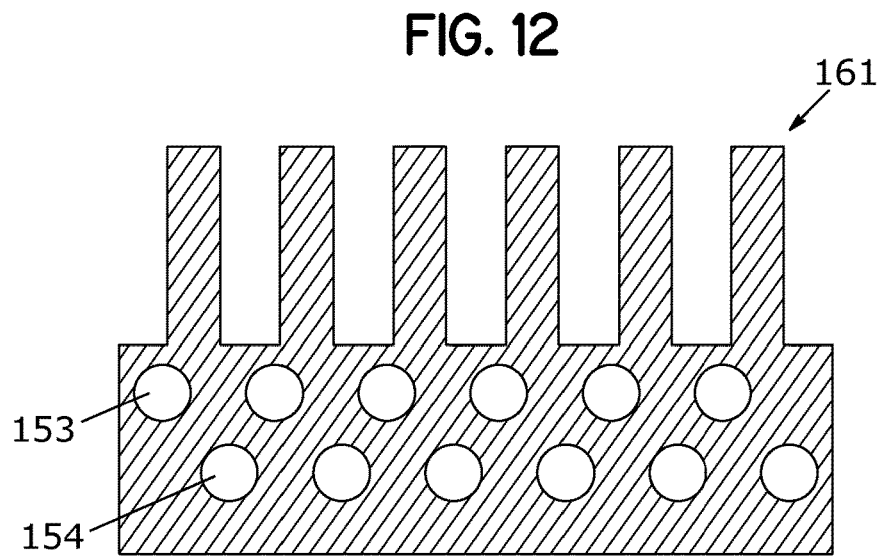
FIG. 13 shows an example of a steel lamination sheet showing only coolant holes in yoke region.
Figure 14:
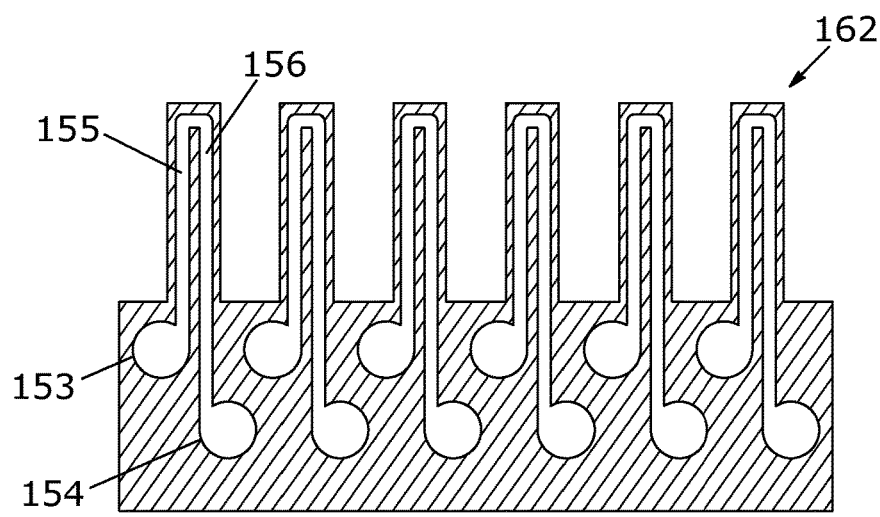
FIG. 14 shows an example of a steel lamination sheet showing radial cooling ducts in teeth section connecting the sets of coolant holes in yoke region.

FIGS. 12 to 14, shows sections of lamination sheets according to an embodiment of the invention. Although the sections are shown as straight elements, it is not restricted to a linear machine. The Figures are more intended for showing the cooling principle.

FIG. 12 shows a section of an end lamination sheet 160, with tooth tips 151 and a yoke part.

FIG. 13 shows a section of a first lamination sheet 161 with the same outline but with holes 153, 154 for forming axial ducts in a stator laminations stack.

FIG. 14 shows a section of a second lamination sheet 162 also with the same outline, here with holes 153, 154, but also a cut out in the tooth parts of the sheet forming a first radial path 155 towards the end of the tip and a second radial path 156 back to the yoke 152.

When combining at least one first lamination sheet 161 followed by a plurality of second lamination sheets, which again is followed at least one first lamination sheet 161. Thereby will the first radial path 155 and the second radial path 156 and the first lamination sheet at each sides of the duct define a radial duct, for cooling the tooth tip. The number of the plurality of second lamination sheet sets the width of the radial duct.

In an embodiment it is desirable to have many small and narrow radial cooling ducts 155 156, which ensures even cooling along the stator lamination stack.

In an embodiment, the second lamination sheet 162 is made of a thicker material so only one sheet forms a radial cooling duct, instead of using a plurality.

Using thicker lamination sheets in an electrical machine is always a tradeoff, as eddy currents occur.

The number of ducts, their individual axial width/thickness and relative spacing can be adjusted so as to effectively increase the total area available for heat transfer between the cooling fluid and that of the stator.

Furthermore, such design flexibility is not impacted by the need to provide a means to provide sufficient air flow and pressure. Moreover, the resulting coolant flows within the stator is not dependent on necessarily having the air flow exit to or enter from the rotor to stator air gap which can greatly impact the air flow rates achievable. In addition since the fluid is captured within lamination sections which have radial ducts, the so-called boundary layer between the cooling fluid and the stator teeth can be quite small.

In fact there are three degrees of freedom to manipulate with when designing a stator stack according to the present invention:

1. Number of radial ducts in the total stator lamination stack;
2. Axial spacing between the individual radial ducts;
3. Axial width of each duct.

In an embodiment of the present invention a further refinement of the invention is proposed, where a higher number of different sheets are used, whereby it is possible to make a softer transition going from the axial ducts to the radial ducts. With the design of FIGS. 8 and 9 and FIGS. 12 to 14 the liquid coolant pass will be forced to make a 90 degree angle, when going from axial to radial flow.

In another embodiment, it is desirable to have fewer, but larger radial cooling ducts, which is expected to lead to a design with temperature gradient along the stator lamination stack.

In an embodiment, less than 10% of the total stack length is made with lamination sheets with radial cooling ducts.

An advantage of this embodiment is that good cooling of the windings and tooth tips is provided while the magnetic design of the electrical machine is not altered significantly.

In an embodiment, 10%-20% of the total stack length is made with lamination sheets with radial cooling ducts.

It is important to recall that the stack sections with radial ducts, have reduced magnetic properties and thus there will be a tradeoff between stack sections with radial cooling ducts and sections with normal magnetic properties, as the magnetic penalties becomes too large if the stack design comprises a too high percentage of radial cooling ducts.

Liquid cooled electrical machines often have hotter end turns, i.e. the part of the winding sticking out of the slot in the ends of the lamination stack, than similar air-cooled machines. The hotter temperature of the end turns are mainly due to lack of airflow around the end turns. Thus, some kind of airflow may be suggested, for this type of machines or as suggested in the described embodiments, the distribution of radial ducts can be positioned within the axial extent of the stack to maintain a more or less uniform stator winding temperature.

For all embodiments the lamination sheets with radial cooling ducts R3, R4 and 161, can be made of a different material than silicon steel, such as ferromagnetic material, which is the most often used material in laminated electrical machines.

In summary the invention relates to a laminated stator stack for an electric machine comprising, a plurality of stator teeth and stator slots, for receiving at least one electrical conductor, at least one axial coolant duct, at least one outwards radial coolant duct and at least one inwards radial coolant duct, wherein the ducts are arranged internally in the laminated stator stack and interconnected to form a predominantly closed flow path, the outwards and inwards radial coolant ducts extent into the stator teeth, for cooling of the stator teeth, and the laminated stator stack comprises a plurality of lamination sheets.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A laminated stator stack for an electric machine comprising,
 a plurality of stator teeth and stator slots, for receiving at least one electrical conductor,
 at least one axial coolant duct spaced from the plurality of stator teeth and stator slots,
 at least one outward radial coolant duct and
 at least one inward radial coolant duct,
 wherein the at least one axial coolant duct, at least one outward radial coolant duct, and the at least one inward radial coolant duct are arranged internally in the laminated stator stack and interconnected to form a predominantly closed flow path, wherein the at least one outward radial coolant duct and at least one inward radial coolant duct extend into the stator teeth, for cooling of the stator teeth, wherein the laminated stator stack is formed by an assembly of a plurality of lamination sheets, and wherein substantially all of the plurality of lamination sheets includes at least one axial coolant hole in a yoke region of the lamination sheet for forming the at least one axial cooling duct.

2. The laminated stator stack according to claim 1, wherein the at least one outward radial cooling duct is formed in a first group of lamination sheets and the at least one inward radial cooling duct is formed in a second group of lamination sheets, and wherein the at least one outward radial cooling duct and the at least one inwards radial cooling duct are interconnected in the teeth, via at least one axial tooth tip duct arranged in a tooth tip.

3. The laminated stator stack according to claim 1, wherein the at least one outward radial cooling duct and the at least one inward radial cooling duct are formed in a same section of lamination sheets.

4. The laminated stator stack according to claim 1, wherein the stack comprises a plurality of alternation between a section of standard lamination sheets, forming the axial cooling ducts, and a section of radial cooling ducts, starting and ending with a section of standard lamination sheets.

5. The laminated stator stack according to claim 4, wherein an axial length of the section of radial cooling ducts is larger at the center of the laminated stator stack and smaller at the ends of the laminated stator stack.

6. The laminated stator stack according to claim 1, wherein less than 10 percent of a total stack length comprises lamination sheets with radial cooling ducts.

7. The laminated stator stack according to claim 1, wherein 10 to 20 percent of a total stack length comprises lamination sheets with radial cooling ducts.

8. The laminated stator stack according to claim 4, wherein the section of standard lamination sheets is made of a first material and the section of radial cooling ducts is made of a second material, wherein the second material has a higher thermal conductivity than the first material.

9. The laminated stator stack according to claim 4, wherein the section of standard lamination sheets is made of a ferromagnetic material and the section of radial cooling ducts is made of a non-ferromagnetic material.

10. A lamination sheet for a laminated stator stack according to claim 1, wherein the lamination sheet comprises an outer outline, an inner outline, at least a first and a second axial coolant hole in a yoke region of the lamination sheet for forming, respectively, a first axial cooling duct and a second axial cooling duct, and in addition at least one cut out area, starting from one of the first or second axial coolant holes, arranged to facilitate a radial flow of a coolant, when used in the laminated stator stack.

11. The lamination sheet according to claim 10, wherein the at least one cut out forms a path from the first hole to the second hole in the yoke region.

12. An electric machine comprising a laminated stator stack according to claim 1, a shaft and at least one electrical winding arranged in is plurality of stator slots.

13. A method for cooling a laminated stator stack for an electric machine, comprising an assembly of a plurality of lamination sheets, a plurality of stator teeth and a plurality of stator slots, and at least one electrical conductor arranged in at least one of said stator slots, the method comprising:
 circulating a liquid coolant in a first axial coolant duct arranged internally in a yoke region of the laminated stator stack spaced from the plurality of stator teeth and stator slots, wherein substantially all of the plurality of lamination sheets includes a first axial coolant hole for forming the first axial cooling duct,
 circulating the liquid coolant in at least one outwards radial coolant duct and, returning the liquid coolant through at least one inwards radial coolant duct to a second axial coolant duct arranged internally in a yoke region of the laminated stator stack spaced from the plurality of stator teeth and stator slots, wherein substantially all of the plurality of lamination sheets includes a second axial coolant hole for forming the second axial cooling duct, interconnecting the at least one outwards radial coolant duct with a corresponding at least one inwards radial coolant duct arranged internally in the laminated stator stack, forming a predominantly closed flow path, the radial coolant ducts extending into the stator teeth, thereby cooling the stator teeth.

14. The laminated stator stack according to claim 1, wherein each of the plurality of lamination sheets includes at least a first axial coolant hole in a yoke region of the lamination sheet, spaced from the plurality of stator teeth and stator slots, for forming a first axial cooling duct.

15. The laminated stator stack according to claim 1, wherein each of the plurality of lamination sheets includes at least a second axial coolant hole in a yoke region of the lamination sheet, spaced from the plurality of stator teeth and stator slots, for forming a second axial cooling duct.

16. The method for cooling a laminated stator stack according to claim 13, wherein each of the plurality of lamination sheets includes a first axial coolant hole for forming the first axial cooling duct.

17. The method for cooling a laminated stator stack according to claim 13, wherein each of the plurality of lamination sheets includes a second axial coolant hole for forming the second axial cooling duct.

18. The method for cooling a laminated stator stack according to claim 13, wherein at least one of the at least one outward radial cooling duct or the at least one inward radial cooling duct is formed in a substantially straight radial line along a stator tooth of the plurality of the stator teeth to the at least one axial coolant duct.

19. A laminated stator stack for an electric machine comprising,
a plurality of stator teeth and stator slots, for receiving at least one electrical conductor,
at least one axial coolant duct spaced from the plurality of stator teeth and stator slots,
at least one outward radial coolant duct and
at least one inward radial coolant duct,
wherein the at least one axial coolant duct, at least one outward radial coolant duct, and the at least one inward radial coolant duct are arranged internally in the laminated stator stack and interconnected to form a predominantly closed flow path, wherein the at least one outward radial coolant duct and at least one inward radial coolant duct extend into the stator teeth, for cooling of the stator teeth, wherein the laminated stator stack is formed by an assembly of a plurality of lamination sheets, and wherein substantially all of the plurality of lamination sheets includes at least one axial coolant hole in a yoke region of the lamination sheet for forming the at least one axial cooling duct,
wherein at least one of the at least one outward radial cooling duct or the at least one inward radial cooling duct is formed in a substantially straight radial line along a stator tooth of the plurality of the stator teeth to the at least one axial coolant duct.

20. The laminated stator stack according to claim 19, wherein the at least one outward radial cooling duct or the at least one inward radial cooling duct form an elbow angle to the at least one axial coolant duct.

21. The laminated stator stack according to claim 19, wherein the at least one outward radial cooling duct and the at least one inward radial cooling duct are formed in a same lamination sheet of the plurality of the lamination sheets.

22. The laminated stator stack according to claim 21, wherein the at least one outward radial cooling duct and the at least one inward radial cooling duct are formed in a same stator tooth of the plurality of the stator teeth.

* * * * *